US008621579B2

(12) United States Patent
Tonegawa

(10) Patent No.: US 8,621,579 B2
(45) Date of Patent: Dec. 31, 2013

(54) COMMUNICATION APPARATUS, ELECTRONIC MAIL TRANSMITTING METHOD, AND ELECTRONIC MAIL TRANSMITTING PROGRAM

(75) Inventor: Nobuyuki Tonegawa, Kanagawa (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/109,455

(22) Filed: May 17, 2011

(65) Prior Publication Data

US 2011/0219436 A1 Sep. 8, 2011

Related U.S. Application Data

(63) Continuation of application No. 10/991,315, filed on Nov. 17, 2004, now abandoned.

(30) Foreign Application Priority Data

Nov. 17, 2003 (JP) .................................. 2003-386985

(51) Int. Cl.
*G06F 21/31* (2013.01)
*G06F 21/10* (2013.01)
(52) U.S. Cl.
USPC .................................................. 726/5; 726/3
(58) Field of Classification Search
USPC ............................................................ 726/5
See application file for complete search history.

(56) References Cited

U.S. PATENT DOCUMENTS

| 6,009,462 | A | * | 12/1999 | Birrell et al. ................... 709/206 |
| 6,189,026 | B1 | * | 2/2001 | Birrell et al. ................... 709/206 |
| 7,173,651 | B1 | * | 2/2007 | Knowles ....................... 348/207.1 |
| 7,962,554 | B2 | * | 6/2011 | Nakao ............................ 709/206 |
| 8,108,479 | B2 | * | 1/2012 | Nakao ............................ 709/206 |
| 2002/0042815 | A1 | * | 4/2002 | Salzfass et al. ................. 709/206 |
| 2002/0104026 | A1 | * | 8/2002 | Barra et al. .................... 713/202 |

(Continued)

FOREIGN PATENT DOCUMENTS

| JP | 11-234496 A | 8/1999 |
| JP | 2001-034580 A | 2/2001 |
| JP | 2002-288059 A | 10/2002 |
| JP | 2003-066857 A | 3/2003 |

OTHER PUBLICATIONS

Sheng et al., "Intranet-Based Mail Fax Gateway Technology," 1997, IEEE, pp. 1607-1612.*

(Continued)

*Primary Examiner* — Luu Pham
(74) *Attorney, Agent, or Firm* — Rossi, Kimms & McDowell LLP

(57) ABSTRACT

A communication apparatus enhances security in transmitting electronic mail to a destination mail address without degrading operability. An MFP is connected to an authentication server and a mail server via a network. A user name and a password are entered in a user name entry screen. The MFP requests the authentication server to authenticate the entered user name and password. When the user name and the password are authenticated, the MFP is operable to acquire an e-mail address, a SMTP authentication user name, and a SMTP authentication password according to SMTP associated with the authenticated user name and password from the authentication server. The MFP requests the mail server to authenticate the acquired SMTP authentication user name and SMTP authentication password according to SMTP. When the SMTP authentication user name and the SMTP authentication password are authenticated, the MFP is operable to transmit an e-mail to the mail server.

9 Claims, 12 Drawing Sheets

(56) References Cited

U.S. PATENT DOCUMENTS

| | | | |
|---|---|---|---|
| 2002/0122215 A1* | 9/2002 | Watanabe | 358/474 |
| 2002/0157028 A1* | 10/2002 | Koue et al. | 713/202 |
| 2002/0191223 A1* | 12/2002 | Ishikawa | 358/402 |
| 2003/0140252 A1 | 7/2003 | Lafon et al. | |
| 2003/0182383 A1* | 9/2003 | He | 709/206 |
| 2003/0233437 A1 | 12/2003 | Kitada et al. | |
| 2004/0003030 A1 | 1/2004 | Abe | |
| 2004/0024823 A1* | 2/2004 | Del Monte | 709/206 |
| 2004/0049548 A1* | 3/2004 | Nakao | 709/206 |
| 2004/0215721 A1* | 10/2004 | Szeto et al. | 709/204 |
| 2004/0243847 A1* | 12/2004 | Way | 713/201 |
| 2005/0073665 A1* | 4/2005 | Taniguchi et al. | 355/53 |
| 2005/0182644 A1* | 8/2005 | Douvikas et al. | 705/1 |
| 2005/0228996 A1* | 10/2005 | Mayer | 713/170 |
| 2005/0278533 A1* | 12/2005 | Mayer | 713/170 |
| 2008/0039052 A1* | 2/2008 | Knowles | 455/412.1 |
| 2011/0202619 A1* | 8/2011 | Nakao | 709/206 |

OTHER PUBLICATIONS

Ken Soohoo, "Multi-Function Internet Appliances," 1997, IEEE, pp. 14-19.*

* cited by examiner

FIG. 4

| USER INFORMATION | | | | |
|---|---|---|---|---|
| 230 | 231 | 232 | 233 | 234 |
| USER NAME | PASSWORD | E-MAIL ADDRESS | SMTP AUTHENTICATION USER NAME | SMTP AUTHENTICATION PASSWORD |
| syain1 | ***** | syain1@xyz.co.jp | syain1 | ***** |
| syain2 | ***** | syain2@xyz.co.jp | syain2 | ***** |
| syain3 | ***** | syain3@xyz.co.jp | syain3 | ***** |
| syain4 | ***** | syain4@xyz.co.jp | syain4 | ***** |
| syain5 | ***** | syain5@xyz.co.jp | syain5 | ***** |
| | | | | |

[ ADD ] 240    [ DELETE ] 241    [ PROPERTY ] 242

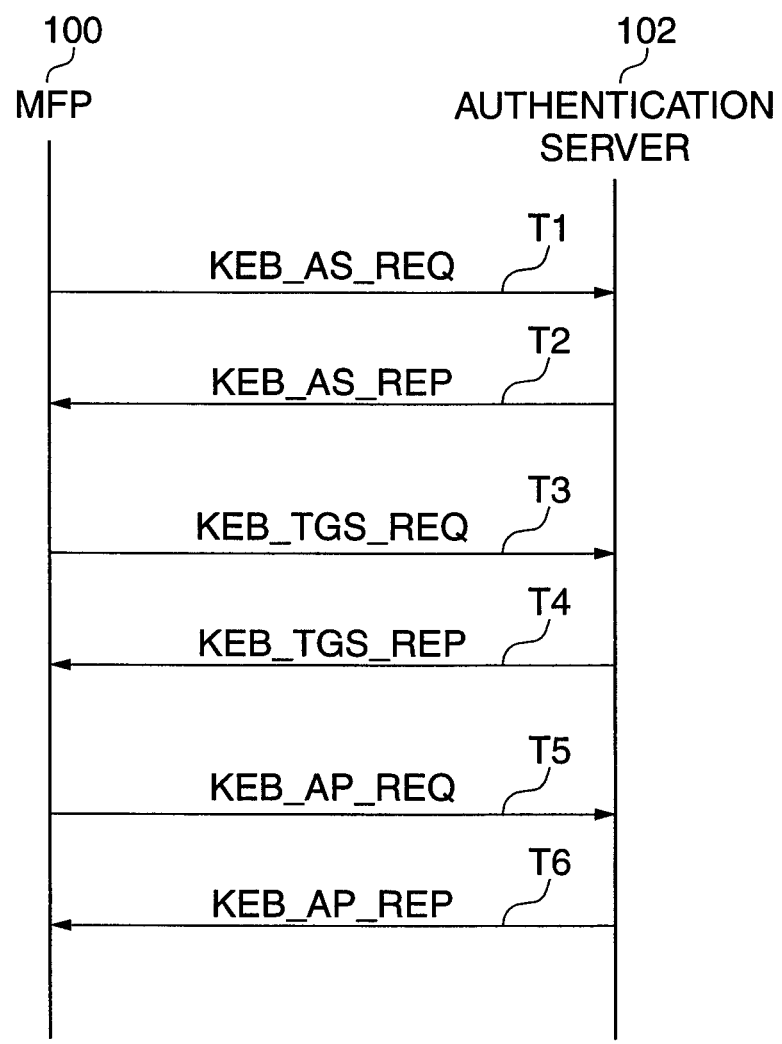

FIG. 7

TRANSMISSION SETUP — 302

- 300 — READING SIZE: AUTO — DETAILS
- 301 — RESOLUTION: 200×200 dpi
- 303 — ADDRESS: ifax@abc.co.jp
- 304 — SUBJECT: DELIVERY OF ESTIMATE SHEET
- 305 — BODY: Thank you for your patronage. Please find enclosed the estimate sheet of the request.

FIG. 8

ADDRESS BOOK

| | SELECTION (350) | MODE (351) | ADDRESS (352) |
|---|---|---|---|
| 1 | ● | EMAIL | pcmail@abc.co.jp |
| 2 | ● | IFAX | ifax@abc.co.jp |
| 3 | ● | EMAIL | syain1@xyz.co.jp |
| 4 | | IFAX | syain2@xyz.co.jp |
| 5 | | IFAX | ifax@copy1.xyz.co.jp |
| 6 | | IFAX | ifaxl@copy2.xyz.co.jp |

*FIG. 11*

| USER NAME | PASSWORD | E-MAIL ADDRESS |
|---|---|---|
| syain1 | ***** | syain1@xyz.co.jp |
| syain2 | ***** | syain2@xyz.co.jp |
| syain3 | ***** | syain3@xyz.co.jp |
| syain4 | ***** | syain4@xyz.co.jp |
| syain5 | ***** | syain5@xyz.co.jp |
|  |  |  |

USER INFORMATION

230 — USER NAME
231 — PASSWORD
232 — E-MAIL ADDRESS
240 — ADD
241 — DELETE
242 — PROPERTY

COMMUNICATION APPARATUS, ELECTRONIC MAIL TRANSMITTING METHOD, AND ELECTRONIC MAIL TRANSMITTING PROGRAM

This is a continuation of application Ser. No. 10/991,315 filed 17 Nov. 2004, the disclosure of which is herein incorporated by reference it its entirety.

BACKGROUND OF THE INVENTION

1. Field of the Invention

The present invention relates to a communication apparatus, an electronic mail transmitting method, and an electronic mail transmitting program, which transmit electronic mails according to a predetermined transmission protocol.

2. Description of the Related Art

In recent years, with proliferation of computers and networking of information, electronic mail communication for exchanging character information via a network has been prevailing. Electronic mail can transmit not only the body of an electronic mail message as character information but also files in various formats as an attachment thereto. For example, Internet FAX, which transmits and receives image data as an attached file in the TIFF (Tag Image File Format) format has come into proliferation.

Internet FAX (hereinafter referred to "iFAX") is a communication technique used for communication between a transmitting apparatus and a receiving apparatus, in which the transmitting apparatus converts image data read using a scanner into the TIFF format and transmits the TIFF image data to the receiving apparatus, and the receiving apparatus prints out the received TIFF image data. To secure compatibility between a plurality of apparatuses, the specification of TIFF image data for communication is standardized in details in the technical specification RFC (Request for Comments) 2301 by the IETF (Internet Engineering Task Force) which is an organization for standardizing Internet techniques.

Further, a SMTP authentication technique in which when transmitting an electronic mail to the mail address of a transmission destination according to Simple Mail Transfer Protocol (SMTP), user authentication is carried out by a mail server before transmission, so as to prevent illegal replaying of an electronic mail with a false mail address, is standardized in the technical specification RFC 2554. An example of such conventional technique of transmitting an electronic mail after execution of user authentication is described e.g. in Japanese Laid-Open Patent Publication (Kokai) No. H11-234496.

Furthermore, the assignee of the present application has already proposed a method in which when a user logs in to an authentication server in advance before transmitting an electronic mail, to have his/her user name and password authenticated, he/she acquires an electronic mail address associated with the authenticated user name, and then transmits the electronic mail to the mail address of a transmission destination, using the acquired mail address as the address of the transmission source (Japanese Patent Application No. 2003-066857).

However, even the proposed electronic mail transmitting method remains to be improved in the following points.

When an electronic mail is transmitted using the SMTP authentication, if set values (i.e. a user name and a password) specific to an apparatus (e.g. a communication apparatus, such as a MFP (Multi-Function Peripheral)) are used as the user name and password for SMTP authentication, a log of the user name of a user who logged in to the authentication server can be stored as a transmission log in the apparatus. However, only the user name specific to the apparatus is stored in the mail server. As a result, the log stored in the apparatus is different from the log stored in the mail server, which makes it difficult to correlate these logs with each other, and hence to identify the real sender. Further, there still remains the possibility that a person other than the user, who knows the user name and password specific to the apparatus, might perform a transmitting operation using the mail address as a disguised user.

Although this inconvenience can be avoided by inputting the user name and password used for SMTP authentication without using the user name and password specific to the apparatus each time an E-mail is transmitted using SMTP authentication, this leads to degradation of operability.

SUMMARY OF THE INVENTION

It is an object of the present invention to provide a communication apparatus, an electronic mail transmitting method, and an electronic mail transmitting program, which are capable of enhancing security in transmission of an electronic mail to a destination mail address, using a transmission protocol, without degrading operability.

To attain the above object, in a first aspect of the present invention, there is provided a communication apparatus connected to an authentication apparatus and a mail distributing apparatus via a network, for transmitting an electronic mail via the mail distributing apparatus according to a predetermined transmission protocol, comprising an input device via which user information is input, a user authentication requesting device that requests the authentication apparatus to authenticate the input user information, an authentication information acquisition device that is operable when the user information is authenticated, to acquire information for authentication according to the transmission protocol associated with the authenticated user information from the authentication apparatus, a transmission authentication requesting device that requests the mail distributing apparatus to authenticate the acquired information for authentication, according to the transmission protocol, and a transmission device that is operable when the acquired information for authentication is authenticated, to transmit an electronic mail to the mail distributing apparatus according to the transmission protocol.

With the arrangement of the first aspect of the present invention, authentication of the input user information is requested of the authentication apparatus, and when the user information is authenticated, information for authentication according to the transmission protocol associated with the authenticated user information is acquired from the authentication apparatus. Then, authentication of the acquired information for authentication is requested of the mail distributing apparatus according to the transmission protocol, and when the acquired information for authentication is authenticated, an electronic mail is transmitted to the mail distributing apparatus according to the transmission protocol. This makes it possible to enhance security in transmission of an electronic mail to a destination mail address, using the transmission protocol, without degrading operability.

Preferably, the authentication apparatus comprises a storage device that stores an electronic mail address associated with the user information and the information for authentication according to the transmission protocol associated with the user information, and the authentication information acquisition device acquires the electronic mail address and the information for authentication stored in the storage device.

With this arrangement of the preferred embodiment, when the user information is authenticated, an electronic mail address associated with the authenticated user information is acquired from the authentication apparatus. This makes it possible to prevent relaying of malicious electronic mails e.g. using false electronic mail addresses.

Preferably, the information for authentication comprises a user name and a password for SMTP authentication, the user name and the password being associated with the user information.

To attain the above object, in a second aspect of the present invention, there is provided a communication apparatus connected to a mail distributing apparatus via a network, for transmitting an electronic mail via the mail distributing apparatus according to a predetermined transmission protocol, comprising an authentication information storage device that stores information for authentication according to the transmission protocol, an input device via which user information is input, a user authentication requesting device that requests authentication of the input user information, an authentication information acquisition device that is operable when the user information is authenticated, to acquire information for authentication according to the transmission protocol associated with the authenticated user information from the authentication information storage device, a transmission authentication requesting device that requests the mail distributing apparatus to authenticate the acquired information for authentication, according to the transmission protocol, and a transmission device that is operable when the acquired information for authentication is authenticated, to transmit an electronic mail to the mail distributing apparatus according to the transmission protocol.

With the arrangement of the second aspect of the present invention, it is possible to obtain the same advantageous effects as provided by the first aspect of the present invention.

Preferably, the authentication information storage device stores an electronic mail address associated with the user information and the information for authentication according to the transmission protocol associated with the user information, and the authentication information acquisition device acquires the electronic mail address and the authentication information stored in the authentication information storage device.

With this arrangement of the preferred embodiment, it is possible to obtain the same advantageous effects as provided by the first-mentioned preferred embodiment of the first aspect of the present invention.

Preferably, the information for authentication comprises a user name and a password for SMTP authentication, the user name and the password being associated with the user information.

To attain the above object, in a third aspect of the present invention, there is provided an electronic mail transmitting method executed by a communication apparatus connected to an authentication apparatus and a mail distributing apparatus via a network, for transmitting an electronic mail via the mail distributing apparatus according to a predetermined transmission protocol, comprising an input step of inputting user information, a user authentication requesting step of requesting the authentication apparatus to authenticate the input user information, an authentication information acquisition step of acquiring information for authentication according to the transmission protocol associated with the authenticated user information from the authentication apparatus, when the user information is authenticated, a transmission authentication requesting step of requesting the mail distributing apparatus to authenticate the acquired information for authentication, according to the transmission protocol, and a transmission step of transmitting an electronic mail to the mail distributing apparatus according to the transmission protocol, when the acquired information for authentication is authenticated.

To attain the above object, in a fourth aspect of the present invention, there is provided an electronic mail transmitting method executed by a communication apparatus connected to a mail distributing apparatus via a network, for transmitting an electronic mail via the mail distributing apparatus according to a predetermined transmission protocol, comprising an input step of inputting user information, a user authentication requesting step of requesting authentication of the input user information, a retaining step of retaining information for authentication according to the transmission protocol on a user-by-user basis, an authentication information acquisition step of acquiring information for authentication according to the transmission protocol associated with the authenticated user information, from the authentication information retained in the retaining step, a transmission authentication requesting step of requesting the mail distributing apparatus to authenticate the acquired information for authentication, according to the transmission protocol, and a transmission step of transmitting an electronic mail to the mail distributing apparatus according to the transmission protocol, when the information for authentication is authenticated.

To attain the above object, in a fifth aspect of the present invention, there is provided an electronic mail transmitting program executed by a communication apparatus connected to an authentication apparatus and a mail distributing apparatus via a network, for transmitting an electronic mail via the mail distributing apparatus according to a predetermined transmission protocol, comprising an input module for inputting user information, a user authentication requesting module for requesting the authentication apparatus to authenticate the input user information, an authentication information acquisition module for acquiring information for authentication according to the transmission protocol associated with the authenticated user information from the authentication apparatus, when the user information is authenticated, a transmission authentication requesting module for requesting the mail distributing apparatus to authenticate the acquired information for authentication, according to the transmission protocol, and a transmission module for transmitting an electronic mail to the mail distributing apparatus according to the transmission protocol, when the acquired information for authentication is authenticated.

To attain the above object, in a sixth aspect of the present invention, there is provided an electronic mail transmitting program executed by a communication apparatus connected to a mail distributing apparatus via a network, for transmitting an electronic mail via the mail distributing apparatus according to a predetermined transmission protocol, comprising an input module for inputting user information, a user authentication requesting module for requesting authentication of the input user information, a retaining module for retaining information for authentication according to the transmission protocol on a user-by-user basis, an authentication information acquisition module for acquiring information for authentication according to the transmission protocol associated with the authenticated user information, from the authentication information retained by the retaining module, a transmission authentication requesting module for requesting the mail distributing apparatus to authenticate the acquired information for authentication, according to the transmission protocol, and a transmission module for transmitting an electronic mail to the mail distributing apparatus according to the transmission protocol, when the information for authentication is authenticated.

The above and other objects, features, and advantages of the invention will become more apparent from the following detailed description taken in conjunction with the accompanying drawings.

BRIEF DESCRIPTION OF THE DRAWINGS

FIG. 4 is a diagram showing an operating screen displayed during execution of a program for looking up user information registered in an authentication server appearing in FIG. 1 and/or editing contents of the user information;

FIG. 6 is a diagram useful in explaining details of the procedure of processing carried out between the MFP and the authentication server, for user authentication;

FIG. 7 is a diagram showing a transmission setup screen displayed on an operating section;

FIG. 8 is a diagram showing an address book for managing transmission destination information;

FIG. 11 is a diagram showing an operating screen displayed during execution of a program for looking up user information registered in the authentication server and/or editing contents of the user information, according to a second embodiment of the present invention;

DETAILED DESCRIPTION OF THE PREFERRED EMBODIMENTS

Figure 1:
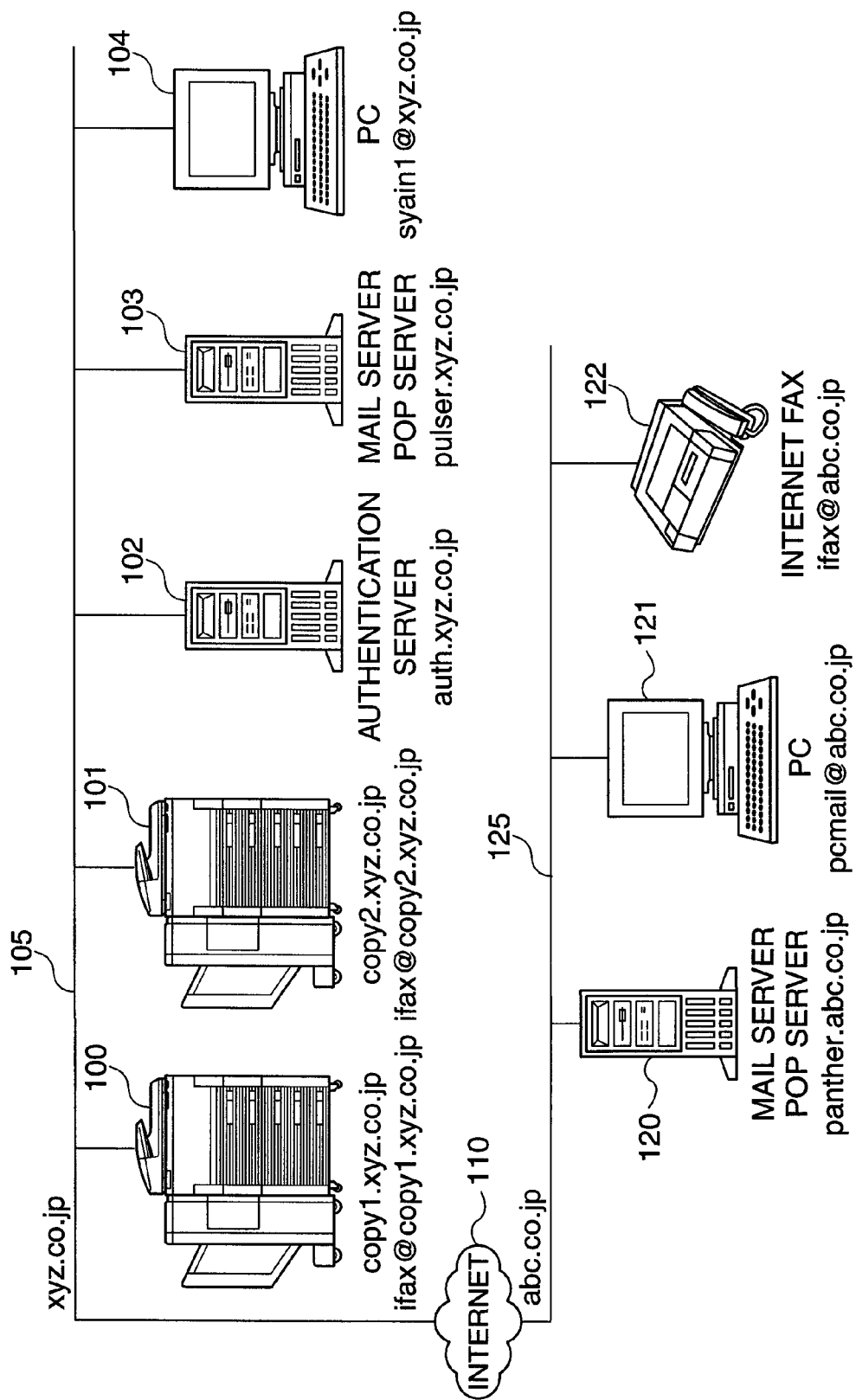
FIG. 1 is a diagram showing the overall arrangement of an electronic mail system including a communication apparatus according to a first embodiment of the present invention.

The present invention will now be described in detail with reference to the drawings showing preferred embodiments thereof. In the drawings, elements and parts which are identical throughout the views are designated by identical reference numerals, and duplicate description thereof is omitted.

FIG. 1 is a diagram showing the overall arrangement of an E-mail system including a communication apparatus according to a first embodiment of the present invention. The E-mail system is comprised of a plurality of apparatuses and devices connected to a first network 105 and a second network 125 via the Internet 110 as a worldwide network.

The first network 105 is assigned a domain name "xyz.co.jp", and has connected thereto MFPs (Multi Function Peripherals) 100 and 101, an authentication server 102, a Mail/POP server 103, and a client PC 104. A second network 125 is assigned a domain name "abc.co.jp", and has connected thereto a Mail and POP server 120, a PC 121, and an Internet FAX 122.

The MFPs 100 and 101 are equipped with a scanner and a printer, and have a copying function, a facsimile (FAX) transmitting and receiving function, and a printer function for printing data generated by a computer. Further, the MFP 100 is assigned a host name "copy1.xyz.co.jp" and an E-mail address "ifax@copy1.xyz.co.jp". The MFP 101 is assigned a host name "copy2.xyz.co.jp" and an E-mail address "ifax@copy2.xyz.co.jp".

The authentication server 102 performs user authentication for the domain of the first network 105, and a plurality of pairs of user names and passwords valid in the domain are registered in the authentication server 102. The PC 104 has general-purpose E-mail software installed therein, and is assigned an E-mail address "syain1@xyz.co.jp". When the power of the client PC 104 is turned on, entry of the user name and password is requested. Then, when the user enters the user name and password, the client PC 104 inquires of the authentication server 102 as to whether or not the entered user name and the password match the registered user name and password. If the user has the user name and the password registered in the authentication server 102, the use of the PC 104 is permitted.

The Mail/POP server 103 has both the functions of a mail server (SMTP server) and a POP server. Needless to say, the mail server (SMTP server) and the POP server may be implemented by respective separate apparatuses. The Mail/POP server 120 in the domain of the second network 125 has the same functions as those of the Mail/POP server 103. For example, when an E-mail is transmitted from the PC 104 to an E-mail address "pcmail@abc.co.jp", E-mail data generated by the PC 104 is sent to the mail server 103 using SMTP (Simple Mail Transfer Protocol), and then further sent from the mail server 103 to the mail server 120 via the Internet 110 using SMTP.

The PC 121 has general-purpose E-mail software installed therein. The PC 121 monitors at predetermined time intervals whether or not any E-mail has arrived at the POP server 120, using POP3 (Post Office Protocol-Version 3), and if any E-mail has arrived at the POP server 120, the PC 121 receives the E-mail data. On the other hand, when the PC 121 having the E-mail address "pcmail@abc.co.jp" sends an E-mail to the PC 104 having the E-mail address "syain1@xyz.co.jp", the route is reversed, that is, E-mail data generated by the PC 121 is sent to the mail server 103 by way of the mail server 120. Then, the PC 104 acquires the delivered E-mail data using the POP3 protocol. The PC 104 has the capabilities of interpreting E-mail data in the MIME format or the like, and decoding image data contained in the E-mail data, for reproduction.

The MFPs 100 and 101 have two transmission modes: an E-mail transmission mode for transmitting an image received using the facsimile (FAX) or iFAX receiving function, or a monochrome/color image scanned by the scanner, on the assumption that the same will be sent to a general E-mail address, and an iFAX transmission mode for transmitting the image on the assumption that the same will be sent to an apparatus compliant with the iFAX standard. The MFPs 100 and 101 use SMTP and POP3 as communication protocols to perform operations similar to the transmitting and receiving operations by the PCs described above.

In the E-mail transmission mode, an image in the JPEG file format (hereinafter simply referred to as a JPEG image) is transmitted. For example, when a color image is transmitted to the client PC 104 having the E-mail address "syain1@xyz.co.jp", the PC 104 receives the E-mail and displays the JPEG image, using a general-purpose image viewer. In the iFAX transmission mode, an image in the TIFF format is transmitted according to the technical specification RFC 2301. For example, an image is transmitted or received by the MFP 100 or the MFP 101 compliant with the iFAX standard or the Internet FAX 122. Between apparatuses capable of processing color images, JPEG images in the TIFF format are transmitted or received.

Figure 2:
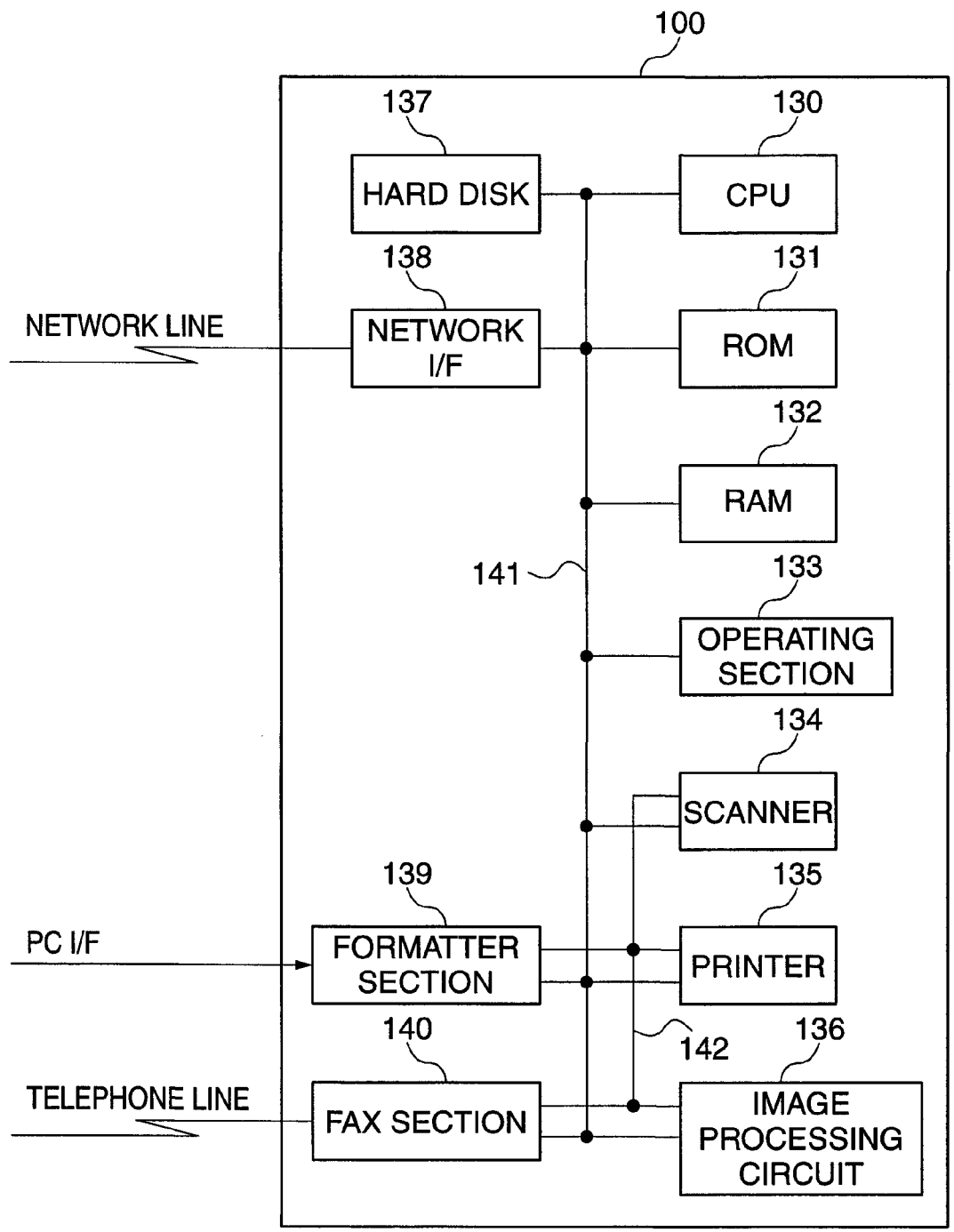
FIG. 2 is a block diagram showing the configuration of a MFP (Multi-Function Peripheral) appearing in FIG. 1.

FIG. 2 is a block diagram showing the configuration of the MFP 100. The MFP 100 and the MFP 101 are identical in configuration, and hence a description will be given of only the configuration of the MFP 100. The MFP 100 is comprised of a CPU 130, a ROM 131, a RAM 132, an operating section 133, a scanner 134, a printer 135, an image processing circuit 136, a hard disk 137, a network interface (I/F) 138, a formatter section 139, and a FAX section 140.

The CPU 130 functions as a control circuit that controls the overall operation of the system. The CPU 130 executes programs stored in the ROM 131 and uses the RAM 132 as a work area. The operating section 133 is comprised of hardware keys, such as a start key and keys of a ten key pad, and a LCD display panel that displays buttons as software keys and detects a touch of any of the displayed buttons by a user's finger, for smooth execution of user operation.

The scanner 134 converts an original image into electric image data by photoelectric conversion. The scanner 134 is comprised of a platen glass on which an original conveyed from an original feeder is placed, a scanner unit including a lamp for illuminating the original, a CCD image sensor for receiving reflected light from the original, mirrors and lenses for guiding the reflected light from the original to the CCD image sensor, and an A/D conversion circuit for converting an electric signal subjected to photoelectrical conversion by the CCD image sensor into digital data, none of the above-mentioned component elements included in the scanner 134 being shown in FIG. 2. When an original conveyed from the original feeder is placed on the platen glass, the lamp is turned on and the scanner unit is caused to start traveling whereby the original is scanned while being exposed to light. Reflected light from the original is guided to the CCD image sensor via the mirrors and the lens. The reflected light is converted into an electric signal by the CDD image sensor, and then the electric signal is converted into digital data by the A/D conversion circuit. After completion of the operation for reading the original, the original is discharged from the platen glass.

The printer section 135 prints image data on a recording sheet. The printer section 135 is comprised of a laser emitting section, a photosensitive drum, a transfer section, a fixing section, a discharge roller, and a sorter having a plurality of bins. The laser emitting section generates a laser beam dependent on the image data. When the laser beam is irradiated onto the photosensitive drum, a latent image is formed on the photosensitive drum according to the laser beam. Developer is applied to the latent image on the photosensitive drum by a developing device, and a recording sheet is fed from a sheet feed cassette in timing synchronous with the start of laser radiation by the laser emitting section, and conveyed to the transfer section. The developer attached to the photosensitive drum as a developer image is transferred onto the recording sheet. When the recording sheet with the developer image transferred thereon is conveyed to the fixing section, the fixing section fixes the developer image on the recording sheet by heating and pressing the recording sheet. The recording sheet having passed through the fixing section is discharged by the discharge roller. Discharged recording sheets are sorted by the sorter into bins thereof.

The image processing circuit 136 is comprised of a large-capacity image memory, an image rotating circuit, a resolution change and scaling circuit, and an encoding and decoding circuit for encoding and decoding MH, MR, MMR, JBIG, JPEG, and like formats of data, and carries out various image processing including shading, trimming, and masking. The hard disk 137 is a large-capacity recording medium connectable by an interface (I/F), such as a SCSI interface or a USB interface. The recording medium is not limited to a hard disk, but a magneto-optical disk (MO) or the like may be employed.

The network I/F 138 is implemented by an Ethernet (registered trademark of Xerox Corporation, US) typified by 10 BASE-T and 100 BASE-T, or a Token Ring (registered trademark of IBM Corporation, US), and operates to achieve a network data link for connection to the network. The formatter section 139 includes an IEEE 1284-compliant parallel interface and a PC interface (I/F), such as USB, and generates image data based on PDL (Page Description Language) data received from a personal computer via the PC interface (I/F) or a network I/F 138. The image processing circuit 136 performs image processing, such as rendering, on the generated image data to print the same by the printer 135.

The FAX section 140, which is connected to a telephone line, is a facsimile I/F circuit including a NCU (Network Control Unit), a MODEM (Modulator/Demodulator), and so on. The FAX section 140 causes the image processing circuit 136 to perform image processing on image data read by the scanner 134, and then transmits the processed image data to another facsimile (FAX) machine via the telephone line, or receives image data sent from another facsimile (FAX) machine and then causes the image processing circuit 136 to perform image processing on the image data for printing by the printer 135.

The scanner 134, the printer 135, the image processing circuit 136, the formatter section 139, and the FAX section 140 are interconnected via a high-speed video bus 142 separate from a CPU bus 141 connected to the CPU 130, so that image data can be transferred at high speed. The use of the high-speed video bus 142 enables the image processing circuit 136 to perform image processing on the image data read by the scanner 134, and the printer 135 to print the processed image data to thereby realize a copying function.

Further, the MFP 100 has a transmission (Send) function for transmitting image data read by the scanner 134 and processed by the image processing circuit 136 to the network 105 via the network I/F, and an iFAX function for transmitting image data generated by the image processing circuit 136 according to the technical specification RFC 2301, using an E-mail protocol.

Figure 3:
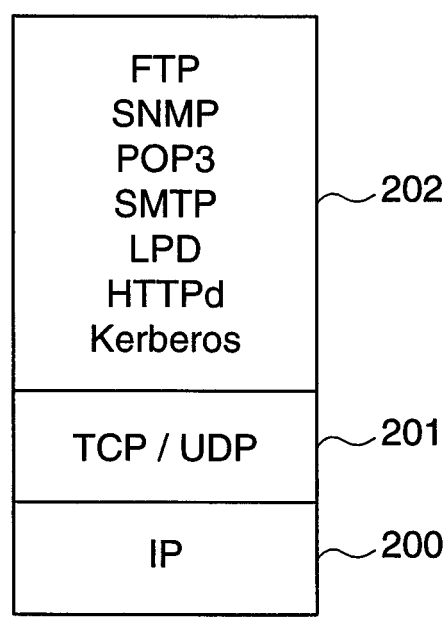
FIG. 3 is a diagram showing the layered structure of network protocols possessed by the MFP.

FIG. 3 is a block diagram showing the layered structure of network protocols possessed by the MFP 100. The network protocols can be roughly grouped into three layers: an IP (Internet Protocol) layer 200, a TCP (Transmission Control Protocol)/UDP (User Datagram Protocol) layer 201, and an application layer 202.

The IP layer 200 is an Internet protocol layer that provides a service for delivering a message from a source host to a destination host via relay nodes, such as routers. The IP layer 200 performs a routing function for managing source addresses from which data is transmitted and destination addresses to which data is transmitted, and determining a route in the network through which data is sent to the destination host, based on address information.

The TCP/UDP layer 201 is a transport layer that provides a service for passing a message from a transmission application process to a reception application process. The TCP, which is a connection-type service protocol, ensures high reliability for communication, whereas the UDP, which is a connectionless-type service protocol, does not ensure reliability.

The application layer 202 defines a plurality of protocols. The protocols defined by this layer 202 include FTP (File Transfer Protocol) as a protocol for file transfer services, SNMP (Network Management Protocol) as a protocol for network management, LPD as a server protocol for printing by the printer, HTTPd as a protocol for WWW (World Wide Web) servers, SMTP (Simple Mail Transfer Protocol) as a protocol for E-mail transmission and reception, and POP3 (Post Office Protocol-Version 3) as a protocol for E-mail downloading. Further, the application layer 202 also contains a Kerberos authentication program defined by the technical specification RFC 1510.

FIG. 4 is a diagram showing an operating screen displayed during execution of a program for looking up user information registered in the authentication server 102 and/or editing contents of the user information. The user information is comprised of a user name 230, a password 231, an E-mail address 232, a SMTP authentication user name 233, and a SMTP authentication password 234. The user name 230 is the name of a user who is permitted to use a computer within the domain (principal) assigned the domain name "xyz.co.jp", which is managed by the authentication server 102. In FIG. 4, there are registered user names "syain1" to "syain5". In the columns of the password 231, there are registered passwords associated with the respective user names. Here, each password is displayed as "xxxxx" so as to prevent a third party from viewing the password easily.

In the columns of the E-mail address 232, there are registered E-mail addresses usable by the respective users registered in the authentication server 102. The E-mail address associated with the user name "syain1" is "syain1@xyz.co.jp". The E-mail address associated with the user name "syain2" is "syain2@xyz.co.jp". The E-mail address associated with the user name "syain3" is "syain3@xyz.co.jp". The E-mail address associated with the user name "syain4" is "syain4@xyz.co.jp". The E-mail address associated with the user name "syain5" is "syain5@xyz.co.jp".

The SMTP authentication user name 233 and the SMTP authentication password 234 are user names and passwords to be used for SMTP authentication (RFC 2554) which is executed according to the SMTP protocol before transmission of an E-mail e.g. from the MFP 100, the MFP 101 or the PC 104 to the mail server 103, to thereby prevent unauthorized access or illegal relay of an E-mail with a false sender name (From Address). Although in FIG. 4, the SMTP authentication user names associated with the user names "syain1" to "syain5" are identical to the associated user names, it is to be understood that different names can be used. Further, similarly to the password 231, the SMTP authentication password 234 is displayed as "xxxxx" so as to prevent a third party from viewing the same easily.

An add key 240 is used for registration of a new user. A delete key 241 is used for deleting a registered user. A property key 242 is used for modifying registered contents, and when the property 242 is depressed, the registered contents are displayed.

Figure 5:
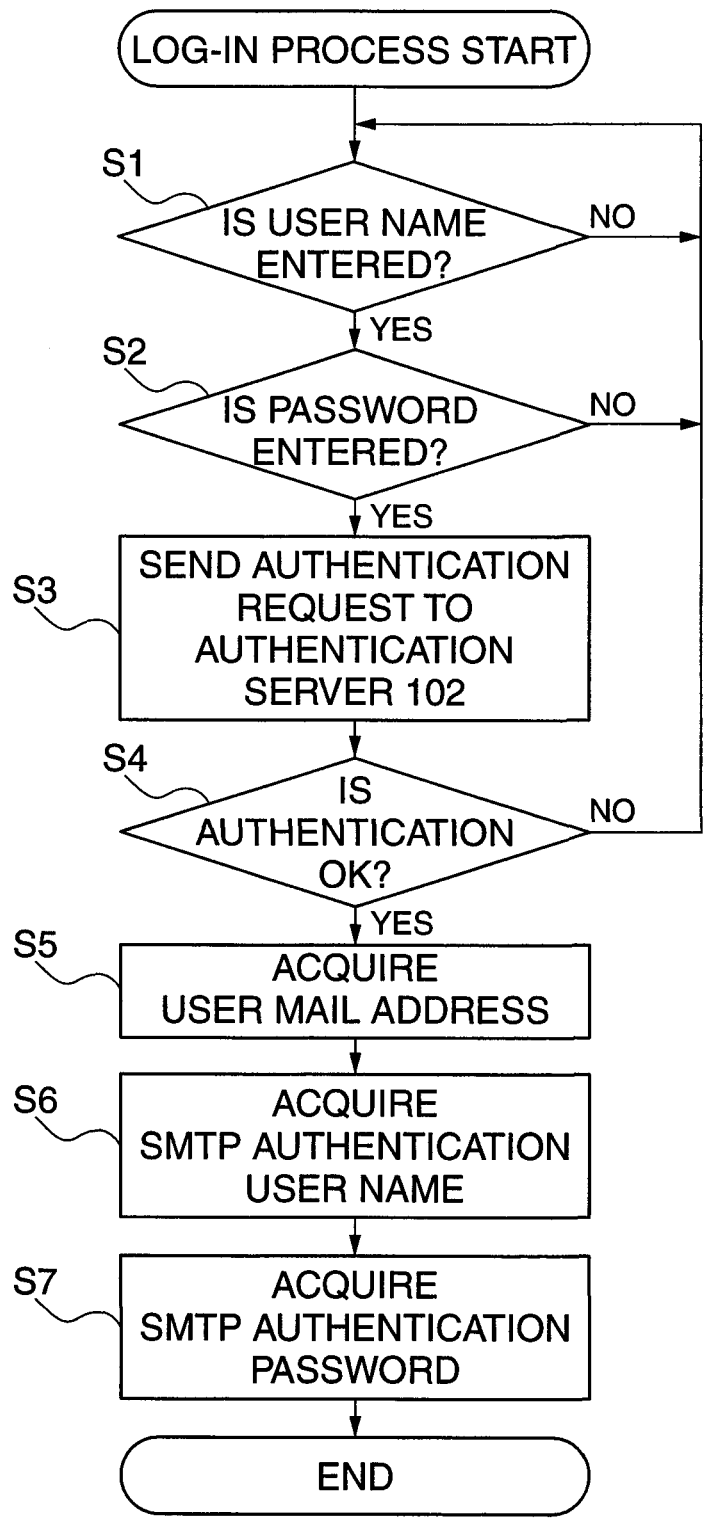
FIG. 5 is a flowchart of a log-in process executed by the MFP for acquiring an E-mail address, a SMTP authentication user name, and a SMTP authentication password.

FIG. 5 is a flowchart of a log-in process executed by the MFP 100, for acquiring an E-mail address, a SMTP authentication user name, and a SMTP authentication password. By executing this log-in process, the MFP 100 requests the authentication server 102 to perform user authentication, whereby E-mail can be used using a designated user name.

This also applies to the MFP 101, and therefore a description will be given of the log-in process of the MFP 100 alone.

After the main power of the MFP 100 is turned on and initialization of the memory, I/O ports, etc. is executed, the present log-in process is started on condition that "User Authentication" is set to "Execute" by system user configuration. In this state, processing requiring user operation, such as copying, is disabled, and a screen prompting the user to enter a user name is displayed on the operating section 133.

First, a user name entry screen is displayed, and entry of a user name by the user is awaited (step S1). When the user name is entered, entry of a password is awaited (step S2). When the password is entered, the user name and the password are sent to the authentication server 102 for authentication thereby (step S3).

Then, it is determined whether or not "authentication OK" has been returned from the authentication server 102, i.e. whether or not it is confirmed by the authentication that the entered user name and password match the user name 230 and the password 231 registered in the authentication server 102 (step S4). If an invalid user name and/or an invalid password have/has been entered, i.e., if not "authentication OK" but "authentication NG" has been returned, the process returns to the step S1, wherein the same processing as described above is carried out again on the user name entry screen. On the other hand, if "authentication OK" has been returned, an E-mail address 232 of the user having logged in, which is registered in the authentication server 102, is acquired from the authentication server 102 (step S5). Further, the user's SMTP authentication user name 233 and SMTP authentication password 234 are acquired from the authentication server 102 (steps S6 and S7), followed by terminating the present process.

When the user authentication is normally completed, the processing requiring user operation, such as copying or transmission (SEND), becomes executable. Although in the present embodiment, the user name and the password are entered for user authentication, a method using biometrics authentication based on a fingerprint, an iris pattern, or the like, or a method using a contact-type or non-contact-type control card may be employed.

FIG. 6 is a diagram useful in explaining details of the procedure of processing carried out between the MFP 100 and the authentication server 102, for user authentication. The user authentication method of the authentication server 102 is an authentication method using Kerberos as one of protocols of the application layer 202. This method is standardized as the technical specification RFC 1510.

First, when a Kerberos authentication service request KEB_AS_REQ is sent from the MFP 100 as a client to the authentication server 102 (T1) to make an inquiry as to whether or not the user is valid, an encrypted log-on session key and client authentication data are returned as a Kerberos authentication service reply KEB_AS_REP from the authentication server 102 to the MFP 100 (T2).

Based on the data, a Kerberos ticket authorization service request KEB_TGS_REQ is generated, and the MFP 100 requests qualification information from the authentication server 102 (T3). Encrypted client authentication data is returned as a Kerberos ticket authorization service reply KEB_TGS_REP from the authentication server 102 (T4).

Based on the data, a Kerberos application request KEB_AP_REQ is generated, and the MFP 100 asks the authentication server 102 to permit use of service (T5). Then, when the Kerberos application reply KEB_AP_REP is returned from the authentication server 102 (T6), if the returned data is normal and it is shown that time data in the returned data is within a predetermined time period, the MFP 100 determines that the authentication is successful.

Although in the present embodiment, the three requests are sent to the same authentication server, this is not limitative, but a plurality of servers may be used e.g. depending on the network configuration. Further, it is possible to employ another authentication method, such as DH (Diffie-Hellman) authentication.

FIG. 7 is a diagram showing a transmission setup screen displayed on the operating section 133. The transmission setup screen is displayed on the operating section 133 when image data read by the scanner 134 is to be sent by E-mail after normal completion of log-in using the user name "syain1" in the log-in process shown in FIG. 5. In a field "Reading size" 300, the size of an original to be read by the scanner 134 is designated. For originals to be read, any one of sheet sizes including A3, A4, A5, B4, B5, 11*17, LTR, and SIMI, and the orientation of the sheet can be designated. In FIG. 7, "auto" is currently set in the field "Reading size" 300, and hence a value detected by an original detection sensor incorporated in the scanner 134 is read in.

In a field "Resolution" 301, a resolution in which an original is to be read by the scanner 134 can be designated. For the resolution, any one of 200*100 dpi, 200*200 dpi, 200*400 dpi, 300*300 dpi, 400*400 dpi and 600*600 dpi can be designated. In FIG. 7, a default value 200*200 dpi is currently set. Further, in a field "Details" 302, it is possible to specify detailed operations for scanning, such as scanning density, the type of the original, double-sided reading, duplex-to-duplex copy, and image quality adjustment.

In a field "Subject" 304 is entered a title given to an E-mail to be sent, and in a field "Body" 305 is entered the body of the E-mail. When each of the setting fields is selected, a software keyboard is displayed to allow entry of a character string. A field "Address" 303 is provided for specifying a destination address.

FIG. 8 is a diagram showing an address book for managing transmission destination information. The E-mail addresses of candidate transmission destinations are displayed in a column "Address" 352. When a checkmark is placed in a checkbox of a column "Selection" 350 of each of selected addresses, whereby the selected address is entered in a field "To:" of an E-mail before the E-mail is sent. In a column "MODE" 351, it is possible to designate either the E-mail transmission mode for transmitting an E-mail on the assumption that the same will be sent to a general E-mail address, or the iFAX transmission mode for transmitting an E-mail on the assumption that the same will be sent to an iFAX apparatus equipped with a function enabling transmission/reception of Internet Faxes between apparatuses. In FIG. 8, there are designated two E-mail destinations (E-mail addresses "pcmail@abc.co.jp" and "syain1@xyz.co.jp") for the E-mail transmission mode, and one iFAX destination (E-mail address "ifax@abc.co.jp") for the iFAX transmission mode.

Figure 9:
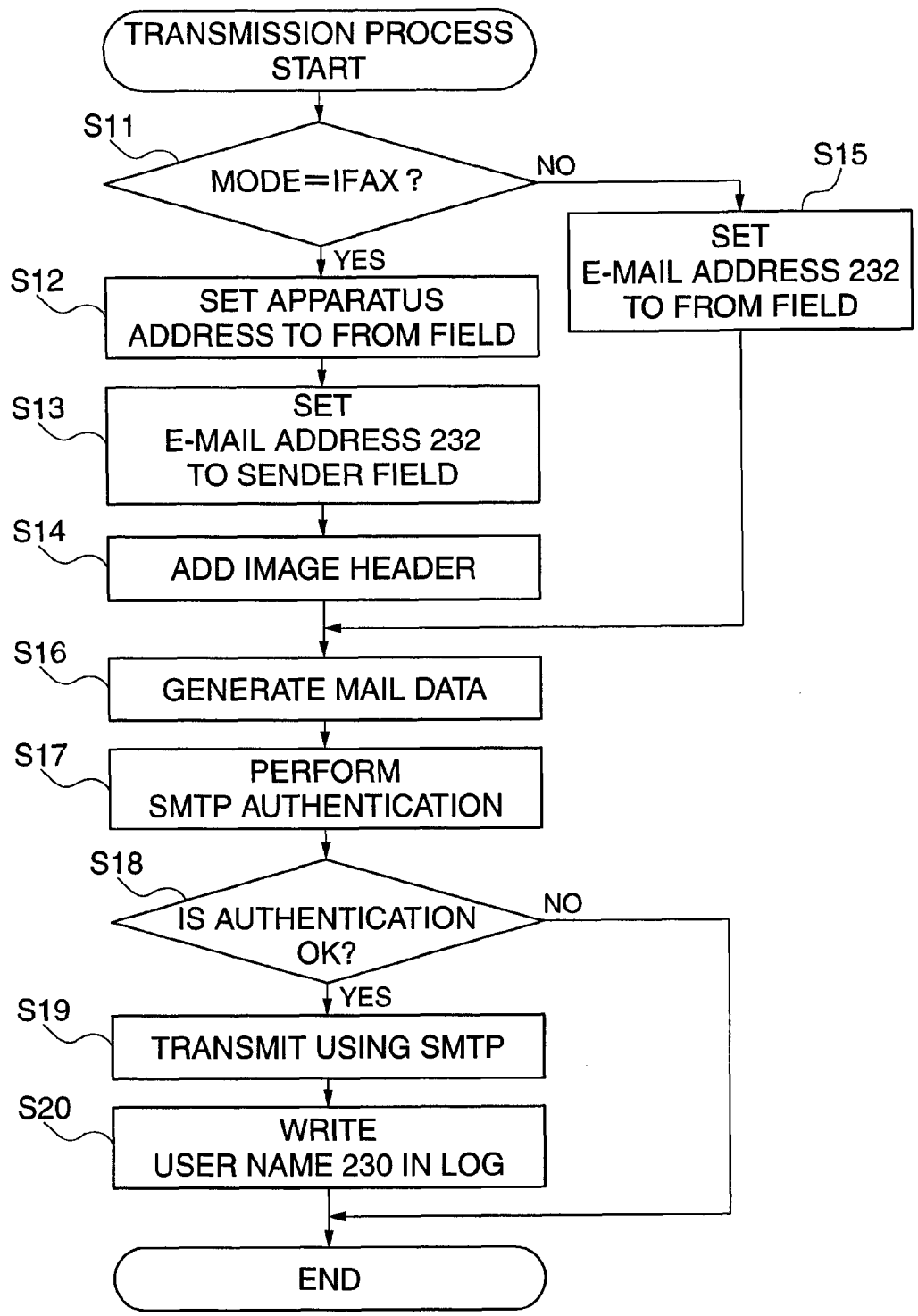
FIG. 9 is a flowchart of a transmission process for reading an original by a scanner and then transmitting an E-mail to destinations.

FIG. 9 is a flowchart of a transmission process for reading an original by the scanner 134 and then transmitting an E-mail to each of selected destinations. A program for executing the present process is stored in a storage medium (the ROM 131 or the hard disk 137) of the MFP 100, and carried out by the CPU 130 when an E-mail is sent to the addresses.

First, it is determined whether or not the iFAX transmission mode is selected as the transmission mode (MODE 351) (step S11). If the iFAX transmission mode is selected, the address of the apparatus, which is entered in a user mode, is set to a field "From" of the header section of the E-mail (step S12). Then, the E-mail address 232 associated with the user name 230 set in the log-in process is set to a field "sender" of the E-mail (step S13; See FIG. 4). In this case, since the user has logged in using the user name "syain1", the E-mail address "syain1@xyz.co.jp" associated with the user name "syain1" is set to the address of the field "Sender" of the E-mail. After having set the "From" field and the "Sender" field, an image header, which has been generated as image data, based on the information of the E-mail address of the transmitting apparatus, the abbreviated name of the transmission destination, and a transmission time, is attached to the upper end of the image read by the scanner.

On the other hand, if the iFAX transmission mode is not selected as the transmission mode, but the E-mail transmission mode is selected, the E-mail address 232 associated with the user name 230, which has been set in the log-in process, is set to the "From" field (step S15). In this case, the "Sender" field is not generated.

Then, a mail data generation process for generating a mail header, adding MIME information, encoding an attached file according to a BASE-64 encoding method, and so forth is carried out based on the information in the "From" field and the "Sender" field (step S16).

Before the generated E-mail data is sent to the mail server 103, SMTP authentication is performed using the SMTP authentication user name and the SMTP authentication password acquired from the authentication server 102 in the steps S6 and S7, respectively (step S17), and the result of the SMTP authentication is determined (step S18). The SMTP authentication will be described in detail hereinafter. After completion of the authentication, i.e. when "authentication OK" is returned, the data is transmitted to the mail server 103, using SMTP (step S19). When the transmission is completed, the user name 230 specified in the log-in process, the transmission destination information, a transmission date, the transmission time, the number of pages for transmission, and the result of the transmission are written in a log (step S20), followed by terminating the present process. On the other hand, if the result of the authentication is "authentication NG" in the step S18, the process is immediately terminated without executing the transmission.

The data written in the log by the MFP 100 is printed as a transmission result report for notifying the result of the transmission or as a communication management report which is generated whenever a predetermined number of transmission events are completed. The printed report allows identification of senders of sent jobs. Further, since a log of the times of execution of SMTP authentication, the authentication user names, and so forth is stored in the mail server 103, the contents of the transmission management report or the communication management report can be checked against the contents of the log stored in the mail server 103. Thus, the validity of the log can be checked. The data written in the log can be displayed as a list on the operating section 133.

Figure 10:
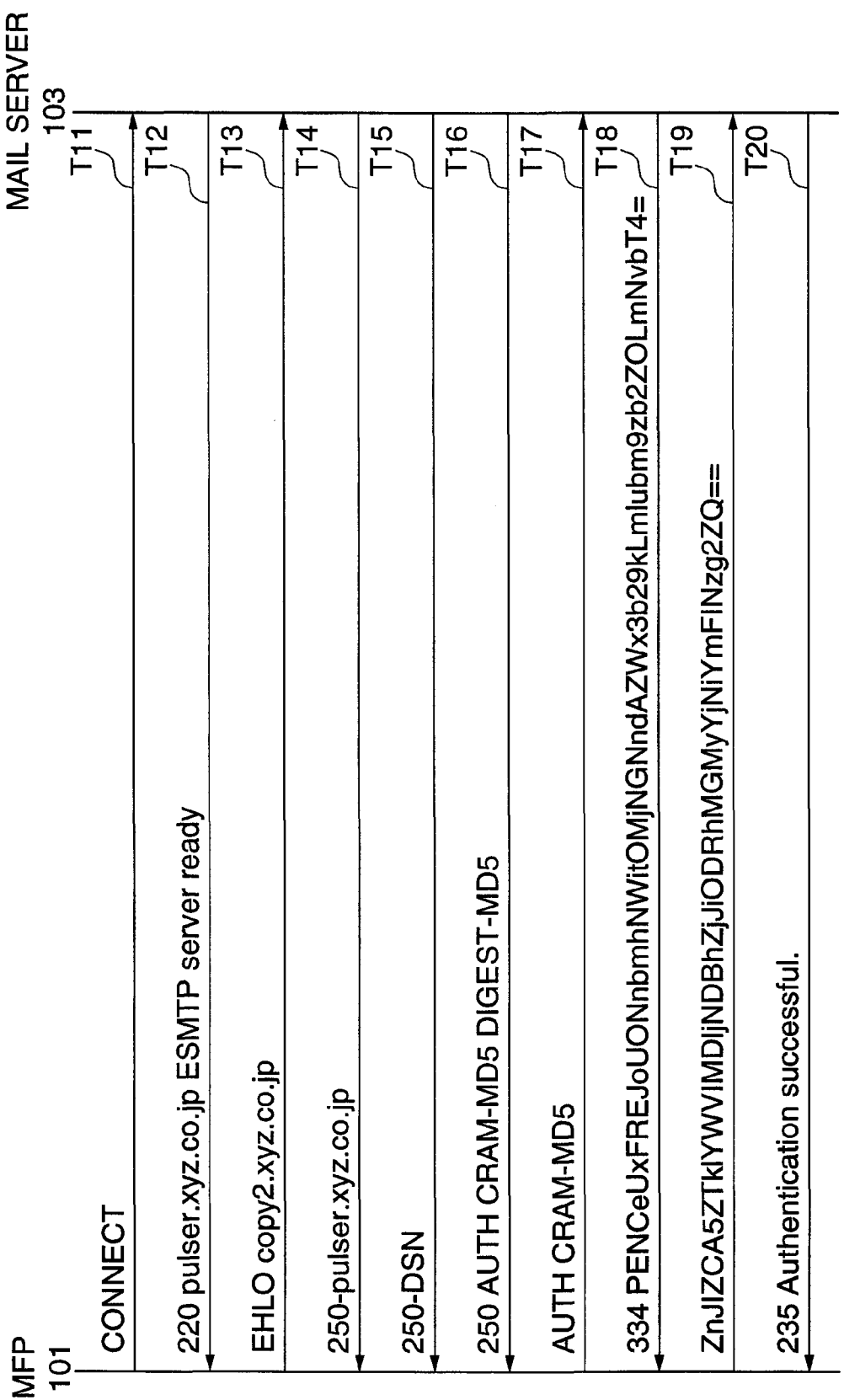
FIG. 10 is a diagram useful for explaining details of the procedure of SMTP authentication performed between the MFP and a mail server, executed in a step S17 in FIG. 9.

FIG. 10 is a diagram useful for explaining details of the procedure of the SMTP authentication performed between the MFP 100 and the mail server 103 in the step S17. This SMTP authentication makes it possible to authenticate the sender of an E-mail before the E-mail is sent from the MFP 101 to the mail server 103, to thereby prevent relaying of malicious E-mails e.g. using false E-mail addresses. The SMTP authentication process described below is mainly executed by the CPU of the MFP 100 and that of the mail server 103.

First, when the MFP 101 accesses the mail server 103 (T11) by SMTP, a numeral "220" indicating that the SMTP service is ready, and a domain name are returned from the mail server 103 (T12). When the MFP 101 as a client sends an EHLO command indicative of the start of an extended SMTP session to the mail server 103 (T13), a command response in the form of a message starting with a numeral "250" indicating that the requested command is successful is returned from the mail server 103 (T14). Further, responses based on one or more SMTP extended functions owned by the mail server 103 are returned (T15 and T16). The T15 response indicates that the mail server 103 has a DSN (Delivery Status Notifications) service function, and the T16 response indicates that the mail server 103 supports a SMTP authentication function SMTP AUTH, and supports authentication methods CRAM-MD 5 and DIGEST-MD 5.

Since it is thus indicated that the mail server 103 is compatible with SMTP AUTH, the MFP 101 sends a command indicating that SMTP AUTH should be used for authentication, and CRAM-MD 5 should be used as the authentication method (T17). The mail server 103 returns a numeral "334" indicative of continuation of the request and a character string as server challenge data (T18). The MFP 101 creates a cryptographic password encrypted by CRAM-MD 5 from the acquired server challenge data and password, and returns the character strings of the encrypted user name and password (T19).

Similarly, the mail server 103 also creates a cryptographic password from the server challenge data sent to the MFP 101 and the password associated with the user name received from the MFP 101, and detects a match between the created cryptographic password and the cryptographic password sent from the MFP 101 to thereby validate the password from the MFP 101. When the validity of the password is verified, the mail server 103 sends a message starting with a numeral "235" indicative of successful authentication (T20), followed by terminating the SMTP authentication.

Thereafter, the E-mail data is transmitted by the normal sequence of SMTP, as described above. When the transmission is completed, the mail server 103 records information of the E-mail address of the MFP 101 from which the E-mail has been received, the E-mail address of the transmission destination, the user name subjected to the SMTP authentication, the transmission date and time, etc. in the log file. The administrator of the mail server 103 can refer to the recorded log file.

As described above, according to the first embodiment, since data written in the log by the MFP 100 is printed as a transmission result report or a communication management report, the sender of the transmitted job can be identified. On the other hand, the mail server 103 stores a log of the times of execution of SMTP authentication, the authentication user names, and so forth. Therefore, an actual sender can be identified by comparing the contents of the transmission result report or the communication management report with those of the log in the mail server. Thus, security in transmission using SMTP authentication can be enhanced without degrading operability.

Further, there is no need to set a SMTP user name, a SMTP authentication password, and an E-mail address to a MFP, which facilitates management including registration and modification of these data. Further, the log of user names authenticated by SMTP authentication is stored in the mail server, as described above, so that it is possible to compare the log with the transmission log stored in the MFP on a one-to-one basis, to thereby enhance security.

In the following, a description will be given of a second embodiment of the present invention with reference to FIGS. 11 to 13.

As distinct from the first embodiment in which SMTP authentication user names and SMTP authentication passwords are managed by the authentication server, in the present embodiment, they are managed by the MFPs. That is, user names for SMTP authentication and passwords associated therewith, which are managed by the authentication server 102 in the first embodiment are stored in the hard disk 137 in the second embodiment.

An E-mail system including a communication apparatus according to the second embodiment is substantially identical in configuration to that of the first embodiment, and therefore component parts identical to those in the first embodiment are designated by identical reference numerals, while omitting description thereof. FIG. 11 is a diagram showing an operating screen displayed during execution of a program according to the second embodiment, for looking up user information registered in the authentication server 102 and/or editing contents of the user information. While in the first embodiment, as shown in FIG. 4, the SMTP authentication user name and the SMTP authentication password are set as user information, in the second embodiment, as shown in FIG. 11, the SMTP authentication user name and the SMTP authentication password are not set.

In FIG. 11, entries in a column "User Name" 230 are registered as user names in the authentication server 102. Entries in a column "Password" 231 are passwords associated with the respective registered user names. Entries in a column "E-mail Address" 232 are E-mail addresses associated with the registered user names. An add key 240 is used for registering a new user. A delete key 241 is used for deleting a registered user. A property key 242 is used for modifying registered contents. When the property 242 is depressed, the registered contents are displayed to allow modification thereof.

Figure 12:
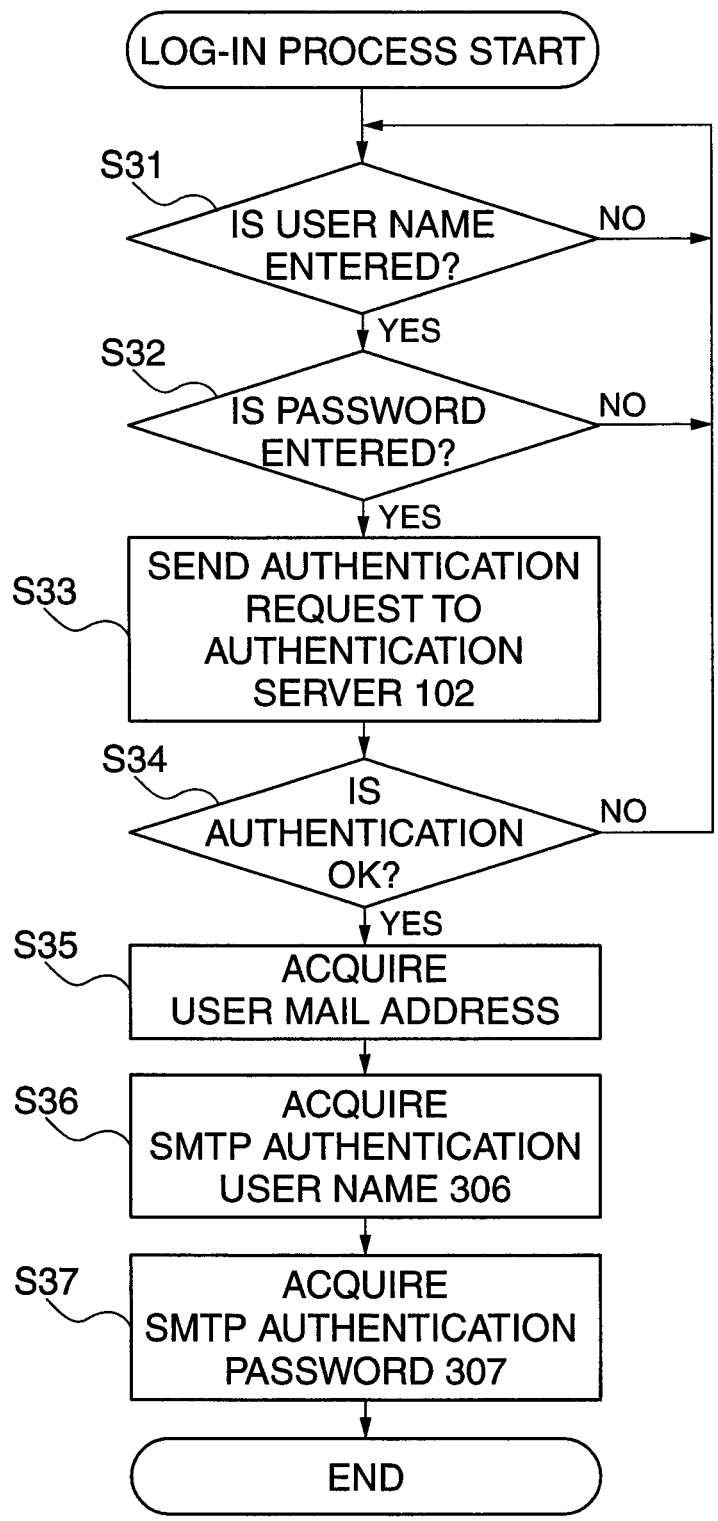
FIG. 12 is a flowchart of a log-in process executed by the MFP for acquiring an E-mail address, a SMTP authentication user name, and a SMTP authentication user password.

FIG. 12 is a flowchart of a log-in process executed by the MFP 100, for acquiring an E-mail address, a SMTP authentication user name, and a SMTP authentication password. By executing this log-in process, the MFP 100 requests the authentication server 102 to perform user authentication, whereby the E-mail service can be used using a designated user name. This also applies to the MFP 101, and therefore a description will be given of the log-in process of the MFP 100 alone.

After the main power of the MFP 100 is turned on and initialization of the memory, I/O ports, etc. is executed, the present log-in process is started on condition that "User Authentication" is set to "Execute" by system user configuration. In this state, processing requiring user operation, such as copying, is disabled, and a screen prompting the user to enter a user name is displayed on the operating section 133.

First, a user name entry screen is displayed, and entry of a user name by the user is awaited (step S31). When the user name is entered, entry of a password is awaited (step S32). When the password is entered, the user name and the password are sent to the authentication server 102 for authentication thereby (step S33).

Then, it is determined whether or not "authentication OK" has been returned from the authentication server 102, i.e. whether or not it is confirmed by the authentication that the entered user name and password match the user name 230 and the password 231 registered in the authentication server 102 (step S34). If an invalid user name and/or an invalid password have/has been entered, i.e., if not "authentication OK" but "authentication NG" has been returned, the process returns to the step S31, wherein the same processing as described above is carried out again on the user name entry screen. On the other hand, if "authentication OK" has been returned, an E-mail address 232 of the user having logged in, which is registered in the authentication server 102, is acquired from the authentication server 102 (step S35).

After acquisition of the E-mail address, a SMTP authentication user name 306, among SMTP authentication user names set for each of users of apparatuses such as the MFP 100 or the MFP 101, is acquired (step S36). Further, a SMTP authentication password 307 also set for each of the users of the apparatuses is acquired (step S37), followed by terminating the present process.

When the user authentication is normally completed, the processing requiring user operation, such as copying or transmission (SEND), becomes executable. Although in the present embodiment, the user name and the password are entered for user authentication, a method using biometrics authentication based on a fingerprint, an iris pattern, or the like, or a method using a contact-type or non-contact-type control card may be employed.

Figure 13:
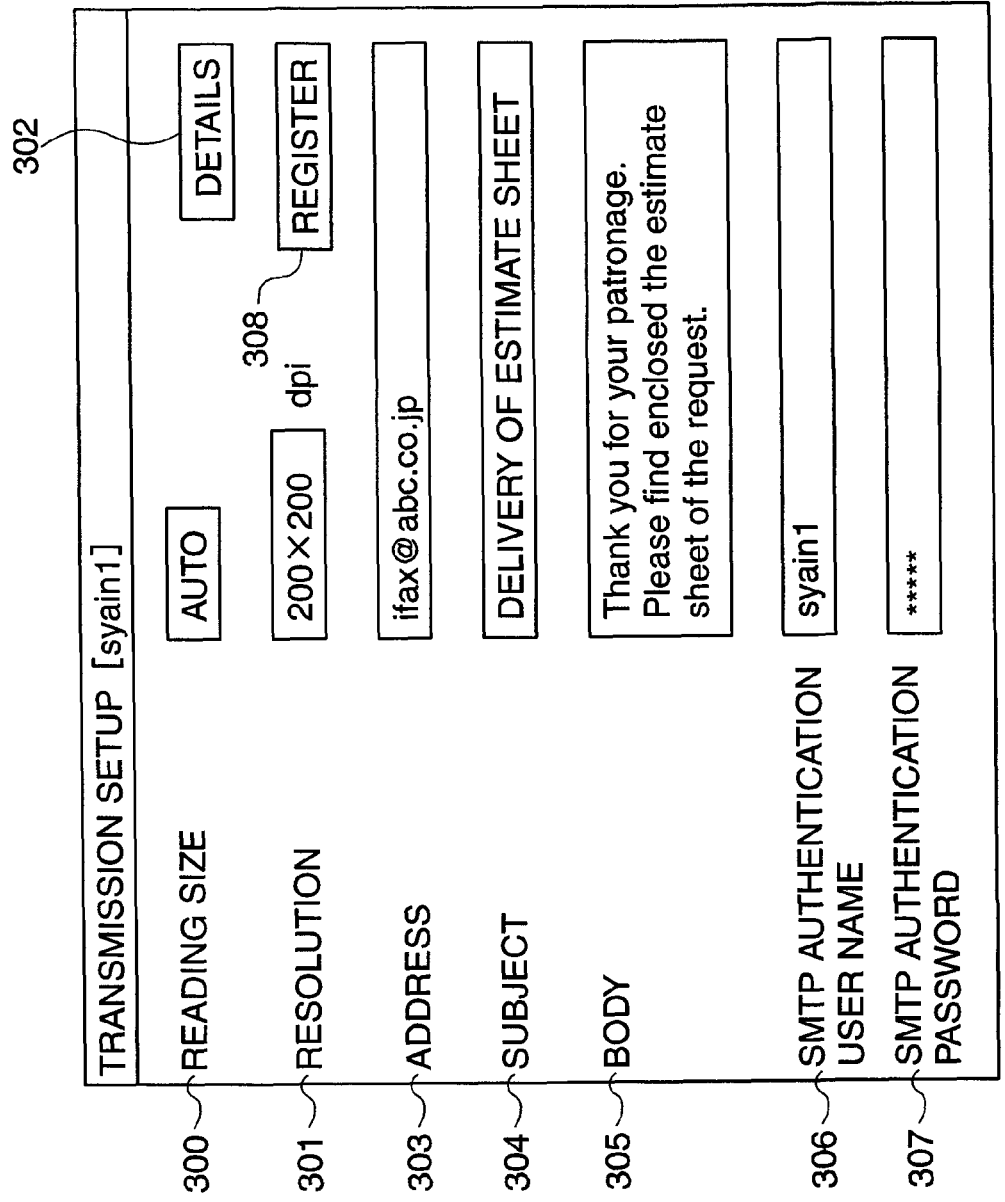
FIG. 13 is a diagram showing a transmission setup screen displayed on an operating section.

FIG. 13 is a diagram showing a transmission setup screen displayed on the operating section 133. On the transmission setup screen, which is used for a "Send" operation, assuming that a user logs in using a user name "syain1", the user name "syain1" used by the user for log-in is displayed at the upper left corner of the screen.

In a field "Reading size" 300, the size of an original to be read by the scanner 134 is designated. For originals to be read, any one of sheet sizes including A3, A4, A5, B4, B5, 11*17, LTR, and STMT, and the orientation of the sheet can be designated. In FIG. 13, "Auto" is currently set in the field-"Reading size" 300, and hence a value detected by an original detection sensor incorporated in the scanner 134 is read in.

In a field "Resolution" 301, a resolution in which an original is to be read by the scanner 134 can be designated. For the resolution, any one of 200*100 dpi, 200*200 dpi, 200*400 dpi, 300*300 dpi, 400*400 dpi and 600*600 dpi can be designated. In FIG. 13, a default value 200*200 dpi is currently set. Further, in a field "Details" 302, it is possible to specify detailed operations for scanning, such as scanning density, the type of the original, double-sided reading, page continuous printing, and image quality adjustment.

In a field "Subject" 304 is entered a title given to an E-mail to be sent, and in a field "Body" 305 is entered the body of the E-mail. When each of the setting fields is selected, a software keyboard is displayed to allow entry of a character string. A field "Address" 303 is provided for specifying a destination address. The address is selected from the address book (see FIG. 8) in the first embodiment.

The SMTP authentication user name 306 and the SMTP authentication password 307 are a user name and a password, respectively, which are used in transmitting E-mail data to the mail server 103, using the SMTP protocol. The user name and password are set parameters stored in the apparatus used by the user, the set parameters being set on a user-by-user basis. When a user logs in, the SMTP authentication user name 306 and the SMTP authentication password 307 are displayed as set parameters on the transmission setup screen. These set parameters can be changed.

The image data read in by the scanner 134 is transmitted by the transmission process in FIG. 9 according to the first embodiment. In the SMTP authentication process in the step S17 of the transmission process, authentication is performed using the SMTP authentication user name 306 and the SMTP authentication password 307.

According to the second embodiment, the same advantageous effects as provided by the first embodiment can be obtained. Further, a MFP, which stores the SMTP authentication user name and the authentication password, is allowed to request the mail server 103 to perform SMTP authentication to thereby execute transmission of an E-mail or the like.

Although in the above-described embodiment, SMTP authentication is performed by the mail server, this is not limitative, but if the SMTP server and the POP server are implemented by the same apparatus, it is possible to employ various other methods including a method in which a user name and a password for POP authentication according to POP-before-SMTP are used.

The present invention is not limited to the above described embodiments, but can be modified in various manners within the scope of the present invention insofar as functions as recited in the appended claims or the functions performed by the construction of either of the above described embodiments can be achieved.

For example, although in the first embodiment, the SMTP authentication user name and the SMTP authentication password are managed by the authentication server, and by a MFP in the second embodiment, it may be configured such that the management can be switched between the authentication server and the MFP. Further, although the authentication server is provided on the network to authenticate user information from a plurality of PCs and MFPs, the same advantageous effects as provided by the first and second embodiments can also be obtained by incorporating the function of the authentication server into the MFPs.

It is to be understood that the object of the present invention may also be accomplished by supplying a system or an apparatus with a storage medium (or a recording medium) in which a program code of software, which realizes the functions of either of the above described embodiments is stored, and causing a computer (or CPU or MPU) of the system or apparatus to read out and execute the program code stored in the storage medium.

In this case, the program code itself read from the storage medium realizes the functions of either of the above described embodiments, and hence the program code and a storage medium on which the program code is stored constitute the present invention.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing the program code readout from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of either of the above-mentioned embodiments on a computer, and the form of the program may be an object code, a program executed by an interpreter, or script data supplied to an OS.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program is supplied by downloading from another computer, a database, or the like, not shown, connected to the Internet, a commercial network, a local area network, or the like.

This application claims priority from Japanese Patent Application No. 2003-386985 filed Nov. 17, 2003, the disclosure of which is herein incorporated by reference in its entirety.

What is claimed is:

1. A communication apparatus that transmits an email with an email distributing apparatus, the communication apparatus comprising:
- a non-transitory computer-readable memory configured to store computer-executable codes; and
- a processor configured to execute the computer-executable codes stored in the non-transitory computer-readable memory to execute:
- an authentication task that authenticates a user;
- an acquiring task that acquires authentication information that has been stored in association with the authenticated user, in a case where the authentication by the authentication task succeeds;
- a performing task that performs a Simple Mail Transfer Protocol (SMPT) authentication with the email distributing apparatus using the authentication information acquired by the acquiring task, when transmitting the email;
- a transmission task that transmits the email in which an email address of the communication apparatus is set to a FROM field, with the email distributing apparatus, when the SMTP authentication performed by the performing task succeeds; and
- a determining task that determines whether a transmission mode is a first transmission mode or a second transmission mode,
- wherein the authentication information acquired by the acquiring task varies with a plurality of users, while the email address of the communication apparatus is common for the plurality of users,
- wherein the transmission task transmits the email in which the email address of the communication apparatus is set to a FROM field if the determining task determines that the transmission mode is the first transmission mode, and
- wherein the transmission task transmits the email in which the email address of the authenticated user is set to a FROM field if the determining task determines that the transmission mode is the second transmission mode.

2. The communication apparatus according to claim 1, wherein the authentication task authenticates the user using an authentication apparatus that is connected to the communication apparatus via a network.

3. The communication apparatus according to claim 2, wherein the acquiring task acquires the authentication information from the authentication apparatus.

4. The communication apparatus according to claim 1, wherein the authentication information includes a username and a password.

5. The communication apparatus according to claim 2, wherein the authentication information includes a username and a password.

6. The communication apparatus according to claim 1, wherein the email address of the authenticated user is acquired from an authentication apparatus that is connected to the communication apparatus via a network.

7. A method of controlling a communication apparatus that transmits an email with an email distributing apparatus, the method comprising:
- an authentication step of authenticating a user;
- an acquiring step of acquiring authentication information that has been stored in association with the authenticated user, in a case where the authentication in the authentication step succeeds;
- a performing step of performing a Simple Mail Transfer Protocol (SMTP) authentication with the email distributing apparatus using the authentication information acquired in the acquiring step, when transmitting the email;
- a transmission step of transmitting the email in which an email address of the communication apparatus is set to a FROM field, with the email distributing apparatus, when the SMTP authentication performed in the performing step succeeds; and
- a determining step of determining whether a transmission mode is a first transmission mode or a second transmission mode,
- wherein the authentication information acquired in the acquiring step varies with a plurality of users, while the email address of the communication apparatus is common for the plurality of users,
- wherein the transmission step transmits the email in which the email address of the communication apparatus is set to a FROM field if the determining step determines that the transmission mode is the first transmission mode, and
- wherein the transmission step transmits the email in which the email address of the authenticated user is set to a FROM field if the determining step determines that the transmission mode is the second transmission mode.

8. A non-transitory computer-readable recording medium storing a computer program executable by a computer to perform a method of controlling a communication apparatus that transmits an email with an email distributing apparatus, the method comprising:
- an authentication step of authenticating a user;
- an acquiring step of acquiring authentication information that has been stored in association with the authenticated user, in a case where the authentication in the authentication step succeeds;
- a performing step of performing a Simple Mail Transfer Protocol (SMTP) authentication with the email distributing apparatus using the authentication information acquired in the acquiring step, when transmitting the email;
- a transmission step of transmitting the email in which an email address of the communication apparatus is set to a FROM field, with the email distributing apparatus, when the SMTP authentication performed in the performing step succeeds; and
- a determining step of determining whether a transmission mode is a first transmission mode or a second transmission mode,
- wherein the authentication information acquired in the acquiring step varies with a plurality of users, while the email address of the communication apparatus is common for the plurality of users,
- wherein the transmission step transmits the email in which the email address of the communication apparatus is set to a FROM field if the determining step determines that the transmission mode is the first transmission mode, and wherein the transmission step transmits the email in which the email address of the authenticated user is set to a FROM field if the determining step determines that the transmission mode is the second transmission mode.

9. A communication apparatus that transmits an email with an email distributing apparatus, the communication apparatus comprising:

an authentication unit configured to authenticate a user;

an acquiring unit configured to acquire authentication information that has been stored in association with the authenticated user, in a case where the authentication by the authentication unit succeeds;

a performing unit configured to perform a Simple Mail Transfer Protocol (SMPT) authentication with the email distributing apparatus using the authentication information acquired by the acquiring unit, when transmitting the email;

a transmission unit configured to transmit the email in which an email address of the communication apparatus is set to a FROM field, with the email distributing apparatus, when the SMTP authentication performed by the performing unit succeeds a determining unit that determines whether a transmission mode is a first transmission mode or a second transmission mode, wherein the authentication information acquired by the acquiring unit varies with a plurality of users, while the email address of the communication apparatus is common for the plurality of users, wherein the transmission unit transmits the email in which the email address of the communication apparatus is set to a FROM field if the determining unit determines that the transmission mode is the first transmission mode, wherein the transmission unit transmits the email in which the email address of the authenticated user is set to a FROM field if the determining unit determines that the transmission mode is the second transmission mode, and wherein the authentication, acquiring, performing, transmission, and determining units are implemented by a processor, at least in part, by executing computer-executable codes stored in a non-transitory computer-readable memory.

* * * * *